(12) United States Patent
Lee

(10) Patent No.: US 11,843,602 B2
(45) Date of Patent: *Dec. 12, 2023

(54) EMBEDDED AUTHENTICATION IN A SERVICE PROVIDER NETWORK

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/010,356

(22) Filed: Sep. 2, 2020

(65) Prior Publication Data

US 2020/0412719 A1 Dec. 31, 2020

Related U.S. Application Data

(63) Continuation of application No. 14/851,228, filed on Sep. 11, 2015, now Pat. No. 10,805,291.

(51) Int. Cl.
| | |
|---|---|
| H04L 9/40 | (2022.01) |
| H04N 21/45 | (2011.01) |
| H04N 21/258 | (2011.01) |
| H04L 41/0873 | (2022.01) |
| H04L 12/28 | (2006.01) |

(52) U.S. Cl.
CPC ...... *H04L 63/0876* (2013.01); *H04L 41/0873* (2013.01); *H04N 21/25816* (2013.01); *H04N 21/4508* (2013.01); *H04L 12/2801* (2013.01)

(58) Field of Classification Search
CPC ............. H04L 63/0876; H04L 41/0873; H04L 12/2801; H04N 21/25816; H04N 21/4508
See application file for complete search history.

(56) References Cited

U.S. PATENT DOCUMENTS

| | | | | |
|---|---|---|---|---|
| 7,367,046 B1* | 4/2008 | Sukiman | ........... | H04L 29/12216 709/219 |
| 8,260,902 B1* | 9/2012 | DeGraaf | ............. | H04L 61/2015 709/228 |
| 8,381,270 B1* | 2/2013 | Hsieh | ................... | H04L 63/0492 726/4 |
| 8,443,187 B1* | 5/2013 | Orr | ...................... | H04L 63/0892 726/5 |
| 8,495,372 B2* | 7/2013 | Bailey | ..................... | H04L 9/088 713/172 |
| 8,561,200 B2* | 10/2013 | Costa | .................... | H04W 12/08 726/26 |
| 8,640,197 B2* | 1/2014 | Heffez | ................... | H04L 63/18 705/37 |

(Continued)

OTHER PUBLICATIONS

European Search Report—EP Appl. 16187045.6—dated Nov. 16, 2016.
Apr. 19, 2018—European Office Action—EP 16187045.6.
Oct. 28, 2022—CA Office Action—CA App. No. 2,941,045.

*Primary Examiner* — J. Brant Murphy
(74) *Attorney, Agent, or Firm* — Banner & Witcoff, Ltd.

(57) ABSTRACT

A computing device may request service from a service provider, and authorization to receive the service may be based, at least in part, on a network access device that is providing the computing device with network access. The service provider may request a value from the computing device, and the value may be based on address information of the computing device and the network access device.

22 Claims, 11 Drawing Sheets

(56) References Cited

U.S. PATENT DOCUMENTS

| | | | | |
|---|---|---|---|---|
| 8,656,458 B2* | 2/2014 | Heffez | H04L 63/18 | 455/414.2 |
| 8,719,568 B1* | 5/2014 | Antypas, III | H04L 63/0884 | 713/168 |
| 8,782,751 B2* | 7/2014 | Chen | H04W 12/06 | 713/161 |
| 8,838,503 B2* | 9/2014 | Pelegero | G06Q 20/40 | 705/66 |
| 8,868,918 B2* | 10/2014 | Jaquet-Chiffelle | H04L 9/3271 | 713/168 |
| 8,892,869 B2* | 11/2014 | Grebovich | H04L 9/3265 | 726/29 |
| 8,909,931 B2* | 12/2014 | Noda | H04L 9/0897 | 713/168 |
| 8,910,255 B2* | 12/2014 | Nice | H04L 63/08 | 713/168 |
| 8,955,075 B2* | 2/2015 | Von Bokern | H04L 63/102 | 726/1 |
| 9,065,903 B2* | 6/2015 | Krantz | H04L 63/083 | |
| 9,118,464 B2* | 8/2015 | Nix | G06F 21/35 | |
| 9,143,506 B2* | 9/2015 | Duncan | G06F 21/32 | |
| 9,161,326 B2* | 10/2015 | Popa | H04L 61/1511 | |
| 2001/0049729 A1* | 12/2001 | Carolan | H04L 12/2872 | 709/245 |
| 2001/0049737 A1* | 12/2001 | Carolan | H04L 12/2801 | 709/228 |
| 2006/0064493 A1* | 3/2006 | Hammell | H04L 63/0815 | 709/227 |
| 2006/0123118 A1* | 6/2006 | Choe | H04L 61/2015 | 709/227 |
| 2006/0137005 A1* | 6/2006 | Park | H04L 63/08 | 726/21 |
| 2007/0022469 A1* | 1/2007 | Cooper | H04L 63/0823 | 726/3 |
| 2007/0133567 A1* | 6/2007 | West | H04L 41/0886 | 370/395.54 |
| 2008/0028437 A1* | 1/2008 | Zeng | H04L 63/08 | 380/232 |
| 2009/0132682 A1* | 5/2009 | Counterman | H04L 63/08 | 709/220 |
| 2010/0131973 A1* | 5/2010 | Dillon | H04N 21/4623 | 725/120 |
| 2011/0078443 A1* | 3/2011 | Greenstein | H04L 63/061 | 713/169 |
| 2011/0103384 A1* | 5/2011 | Hackbart | H04L 61/1511 | 370/392 |
| 2012/0011567 A1* | 1/2012 | Cronk | H04N 21/47202 | 726/28 |
| 2013/0139232 A1* | 5/2013 | Carolan | H04L 47/20 | 726/6 |
| 2014/0189840 A1* | 7/2014 | Metke | H04L 63/0815 | 726/9 |
| 2014/0298418 A9* | 10/2014 | Cronk | H04N 21/4753 | 726/28 |
| 2015/0215301 A1* | 7/2015 | Fischer | H04L 63/0823 | 726/7 |
| 2015/0249540 A1* | 9/2015 | Khalil | H04L 63/0876 | 713/158 |
| 2016/0088327 A1 | 3/2016 | Cronk et al. | | |
| 2017/0222900 A1* | 8/2017 | Kaal | H04L 43/0811 | |

* cited by examiner

| Account No. | Name | Mailing Address | Interface Device Serial No. | AuthZ Services |
|---|---|---|---|---|
| 12345 | First Name, Last Name | 123 Main Street, Anytown USA | AA-000-0001 | Premium Channel 1 |
| 12346 | First Name, Last Name | 125 Main Street, Anytown USA | AA-000-0002 | Premium Channel 2 |
| 12347 | First Name, Last Name | 127 Main Street, Anytown USA | AA-000-0003 | Premium Channel 3 |
| 12348 | First Name, Last Name | 129 Main Street, Anytown USA | AA-000-0004 | Premium Channel 4 |
| 12349 | First Name, Last Name | 131 Main Street, Anytown USA | AA-000-0005 | Premium Channel 5 |
| 12350 | First Name, Last Name | 133 Main Street, Anytown USA | AA-000-0006 | Premium Channels 1-5 |

| CM MAC | CM IP | CPE MAC | CPE IP |
|---|---|---|---|
| xx-xx-xx-xx-xx-xx | xxx.xxx.xxx.xxx | xx-xx-xx-xx-xx-xx | xxx.xxx.xxx.xxx |
| xx-xx-xx-xx-xx-xx | xxx.xxx.xxx.xxx | xx-xx-xx-xx-xx-xx | xxx.xxx.xxx.xxx |
| xx-xx-xx-xx-xx-xx | xxx.xxx.xxx.xxx | xx-xx-xx-xx-xx-xx | xxx.xxx.xxx.xxx |
| xx-xx-xx-xx-xx-xx | xxx.xxx.xxx.xxx | xx-xx-xx-xx-xx-xx | xxx.xxx.xxx.xxx |
| xx-xx-xx-xx-xx-xx | xxx.xxx.xxx.xxx | xx-xx-xx-xx-xx-xx | xxx.xxx.xxx.xxx |
| xx-xx-xx-xx-xx-xx | xxx.xxx.xxx.xxx | xx-xx-xx-xx-xx-xx | xxx.xxx.xxx.xxx |

FIG. 5

EMBEDDED AUTHENTICATION IN A SERVICE PROVIDER NETWORK

CROSS REFERENCE TO RELATED APPLICATIONS

This application claims priority to and is a continuation of U.S. application Ser. No. 14/851,228, filed Sep. 11, 2015, the content of which is incorporated herein by reference in its entirety.

BACKGROUND

Television (TV) service providers may employ the DOCSIS standard (Data Over Cable Service Interface Specification) to provide high-bandwidth data transfer on a TV network. A TV network may provide an overlay network that runs on top of the TV network such as, e.g., a network that uses the Transmission Control Protocol/Internet Protocol (TCP/IP) communications protocol. In this way, TV service providers may provide access to the Internet via a TV network.

The DOCSIS standard defines a certification-based security mechanism to authenticate a cable modem connected to the TV network. Through authentication of the cable modem, TV service providers can in turn authenticate the customer premises equipment (CPE) devices of subscribers. The authentication information for the cable modem, however, is not be usable on the IP-based overlay network of the TV network due to the differences between the DOCSIS and IP standards. As a result, IP-based network elements that are not connected to the DOCSIS-based network might be unable to authenticate CPE devices based solely on, e.g., the source IP address of the CPE device.

SUMMARY

Systems and methods are described for leveraging authentication information associated with a cable modem when authenticating a device requesting access to a network from a network element are described herein. More particularly, aspects of the present disclosure discuss extending the trust relationship established between an interface device (e.g., a cable modem) and a cable network to CPE devices operating on a service provider network that includes a cable network and an IP-based overlay network. By extending this trust relationship, network elements can thus authenticate the CPE devices even though those network elements are only connected to the overlay network of the service provider network. A cable modem may be authenticated using the DOCSIS standard, and IP-based CPE devices are provided authentication information associated with the authenticated cable modem. When the IP-based CPE device requests services from an IP-based network element, that network element challenges the CPE device for the authentication information associated with the authenticated cable modem. The IP-based network element may thus authenticate the IP-based CPE device based, at least in part, on the authentication information provided to the network element.

The service provider network may include one or more back-end network elements utilized to authenticate a CPE device. In some example implementations, the service provider network may include an authentication server in signal communication with the network elements that provide access to the service provider network. The authentication server may provide an authentication Application Programming Interface (API) that allows a network element to request authentication of a CPE device requesting network access. In these example implementations, the authentication server may be in signal communication with an operations support system (OSS) server that maintains the authentication information associated with authenticated cable modems. The authentication server may thus authenticate a CPE device based on information provided by the network element that was received from a CPE device with the network access request and based on information retrieved from the OSS server.

The CPE device may be one of multiple CPE devices at the customer premises that access the service provider network via the cable modem. The CPE device may be a personal computing device or a router that is connected to one or more personal computing devices via wired or wireless connections. In some example implementations, the CPE device may be an interface device that includes, as a singular unit, an embedded cable modem as well as an embedded router. One or more personal computing devices may also be connected to the interface device via wired or wireless connections. The interface device may thus manage both the connection to the service provider network as well as the routing of communications between the service provider network and the CPE devices.

In some aspects, service requests may include any type of request that seeks to access or consume the services provided by the service provider network. When the service provider provides content delivery services (e.g., delivery of video content), a service request may be a request for video content. When the service provider provides Internet access services, the service request may be a request to access the Internet. A service provider may also provide access to a web portal, and a service request may thus be a request to access the web portal. Additional examples of services will be appreciated with the benefit of this disclosure.

In addition, the techniques described herein advantageously allow a service provider to obtain data associated with the user account based on the token (or data) received from the CPE device with a service request. The service provider may thus provide the requested service based on the information obtained. As one example, a CPE device may submit to a network element a request for video streaming services. The network element may, in turn, utilize a token (or data) received from the CPE device to lookup the user account associated with the CPE device and determine whether that user account is authorized to receive the requested video streaming service.

The techniques described herein may also advantageously allow a service provider to bypass multi-factor authentication when the CPE device can be authenticated based on the token (or data) provided. As another example, a CPE device may request to access a protected web portal requiring multi-factor authentication to gain access. The network element that provides access to the web portal may utilize the token (or data) received from the CPE device to determine whether the CPE device is operating from behind a trusted cable modem. If so, the network element may bypass the multi-factor authentication to automatically provide access to the protected web portal without involvement of the user.

In some aspects, third-party service providers may also use the authentication capabilities of the service provider network described herein. A third-party service provider network element may be located remotely relative to the service provider network and in signal communication with the authentication server of the service provider network via a wide area network (WAN) such as the Internet. When a CPE device submits a service request to the third-party service provider network element, the third-party service provider network element may utilize the authentication API of the authentication server to authenticate the CPE device. The third-party service provider network element may retrieve data associated with a user account based on the token (or data) received from the CPE device with a service request. The third-party service provider network element may then compare the retrieved data to data stored by the third-party service provider and perform various actions when the data matches. As an example, a third-party service provider may retrieve a unique user identifier associated with the CPE device using the token (or data) received from the CPE device with a service request. If the unique user identifier retrieved matches a unique user identifier stored by the third-party service provider, then the third-party service provider may, e.g., provide the requested service based on the unique user identifier, bypass multi-factor authentication, or perform other types of actions that will be appreciated with the benefit of this disclosure.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 5 illustrates an example table for mapping network configuration data in accordance with aspects described herein.

DETAILED DESCRIPTION

Features described herein relate to authenticating devices requesting access to a network that utilizes one network standard wherein the devices have been provisioned with network configuration data via a trusted device that has been authenticated using a different network standard.

Figure 1:
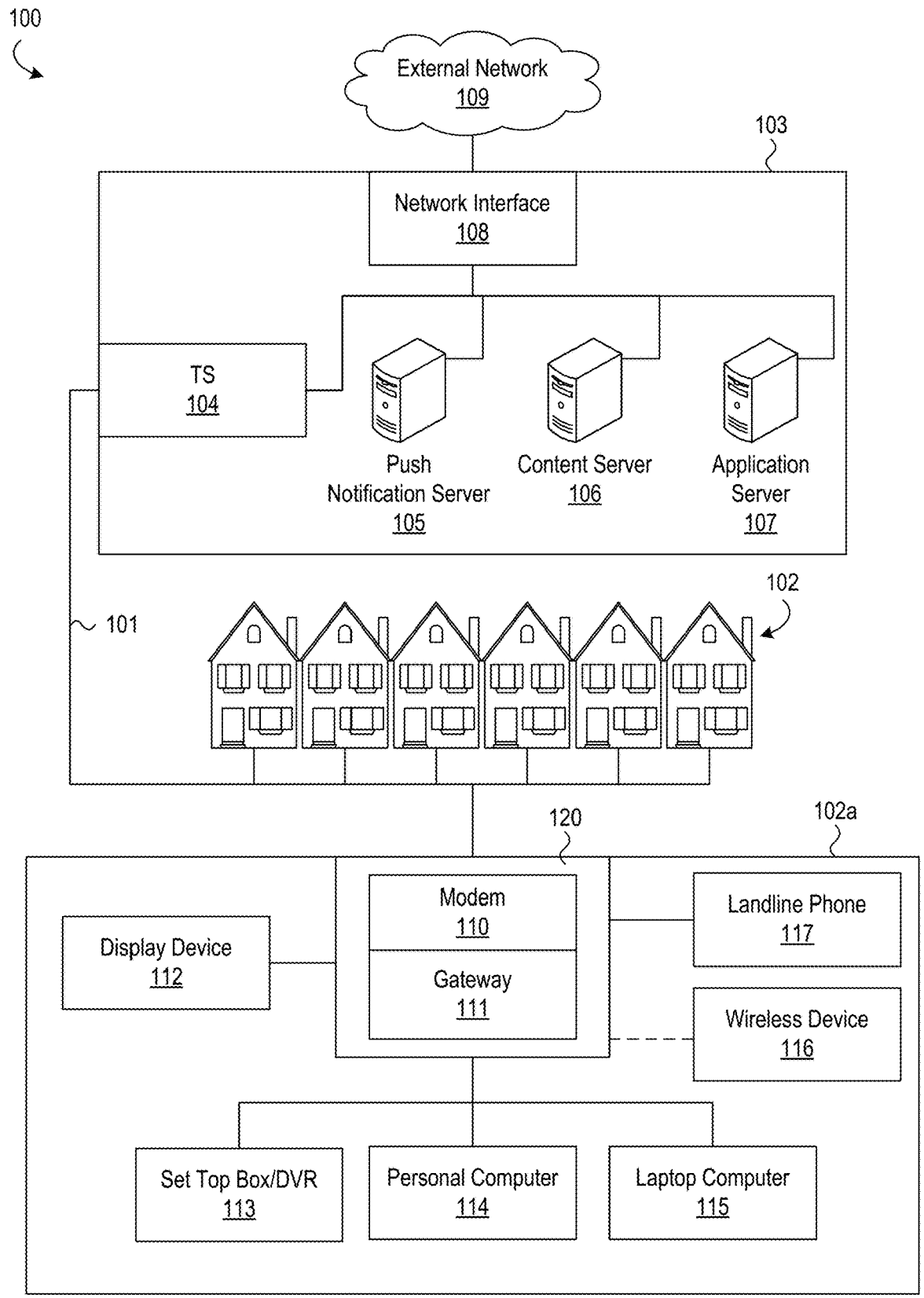
FIG. 1 illustrates an example communication network on which aspects described herein may be used

FIG. 1 illustrates an example communication network 100 on which some or all of the various features described herein may be implemented. The network 100 may be any type of information distribution network, such as satellite, telephone, cellular, wireless, etc. One example may be an optical fiber network, a coaxial cable network, and/or a hybrid fiber/coax distribution network. The network 100 also may include multiple types of networks (e.g., Wi-Fi 802.11a-n, Ethernet, 3G, 4G, and 4GLTE) that interconnect. Such networks 100 use a series of interconnected communication links 101 (e.g., coaxial cables, optical fibers, wireless, etc.) to connect multiple premises 102 (e.g., businesses, homes, consumer dwellings, etc.) to a local office or head end 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the DOCSIS standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Still another application server 107 may be responsible for tracking and collecting billing data associated with various equipment at the premises 102. Although shown separately, one of ordinary skill in the art will appreciate that the push notification server 105, content server 106, and application server 107 may be combined. Further, here the push notification server 105, content server 106, and application server 107 are shown generally, and it will be understood that they may each contain computer memory storing computer-executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway device 111, such as a gateway interface device. The modem 110 may be connected to, or be a part of, the gateway device 111. The gateway device 111 may be a computing device that communicates with the modem(s) 110 to allow one or more other devices in the premises 102a, to communicate with the local office 103 and other devices beyond the local office 103. The gateway device 111 may be a set-top box (STB), digital video recorder (DVR), computer server, or any other desired computing device. The gateway device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
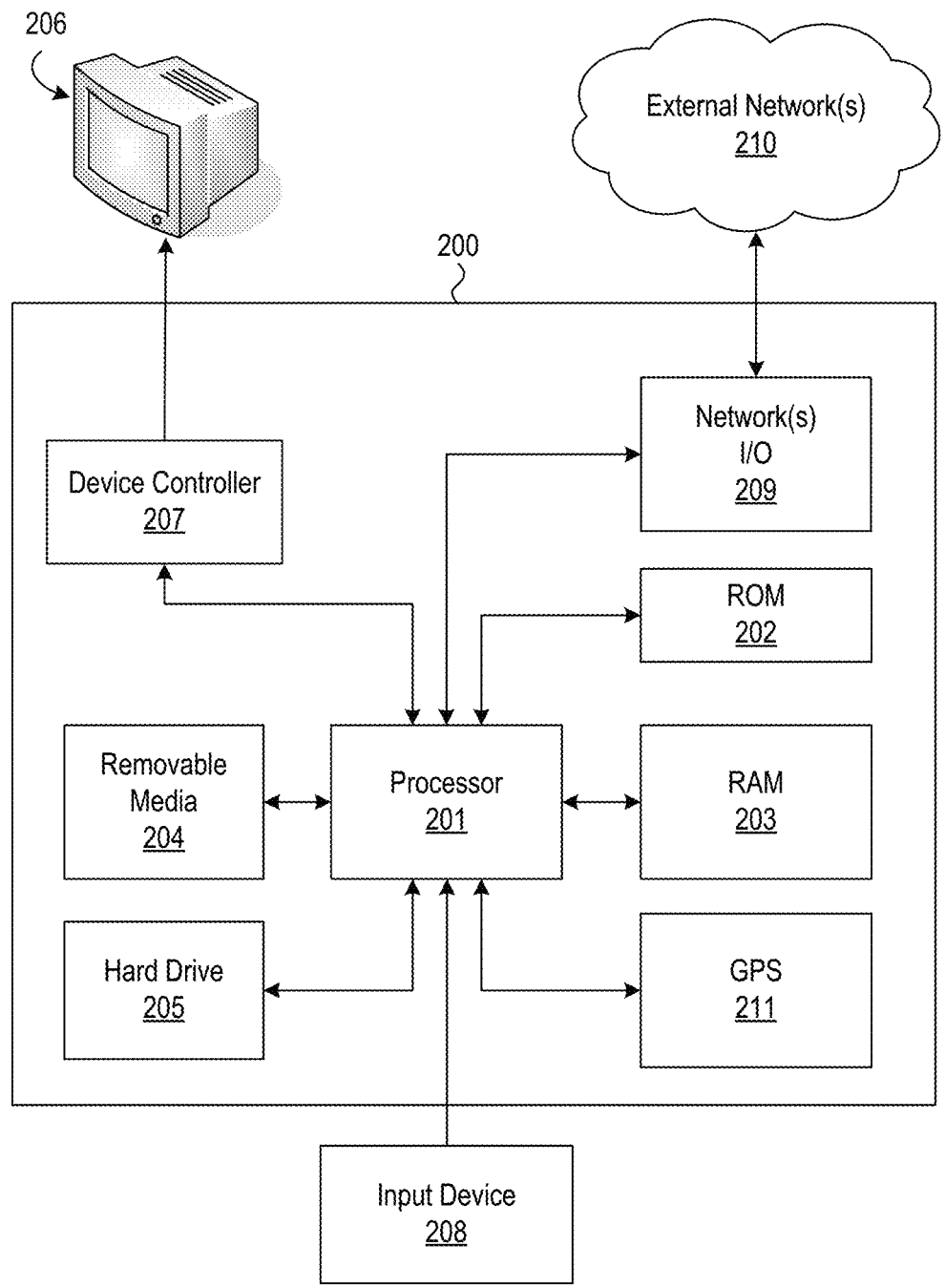
FIG. 2 illustrates an example computing platform on which aspects described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network I/O circuit 209 may be a wired interface, wireless interface, or a combination of the two. In some examples, the network input/output circuit 209 may include a modem (e.g., a cable modem), and the external network 210 may include communication links such as communication links 101 discussed above, the external network 109 discussed above, an in-home network, a provider's wireless, coaxial, fiber, or hybrid fiber/coaxial distribution system (e.g., a DOCSIS network), or any other desired network. Additionally, the computing device 200 may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more non-transitory computer readable media such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
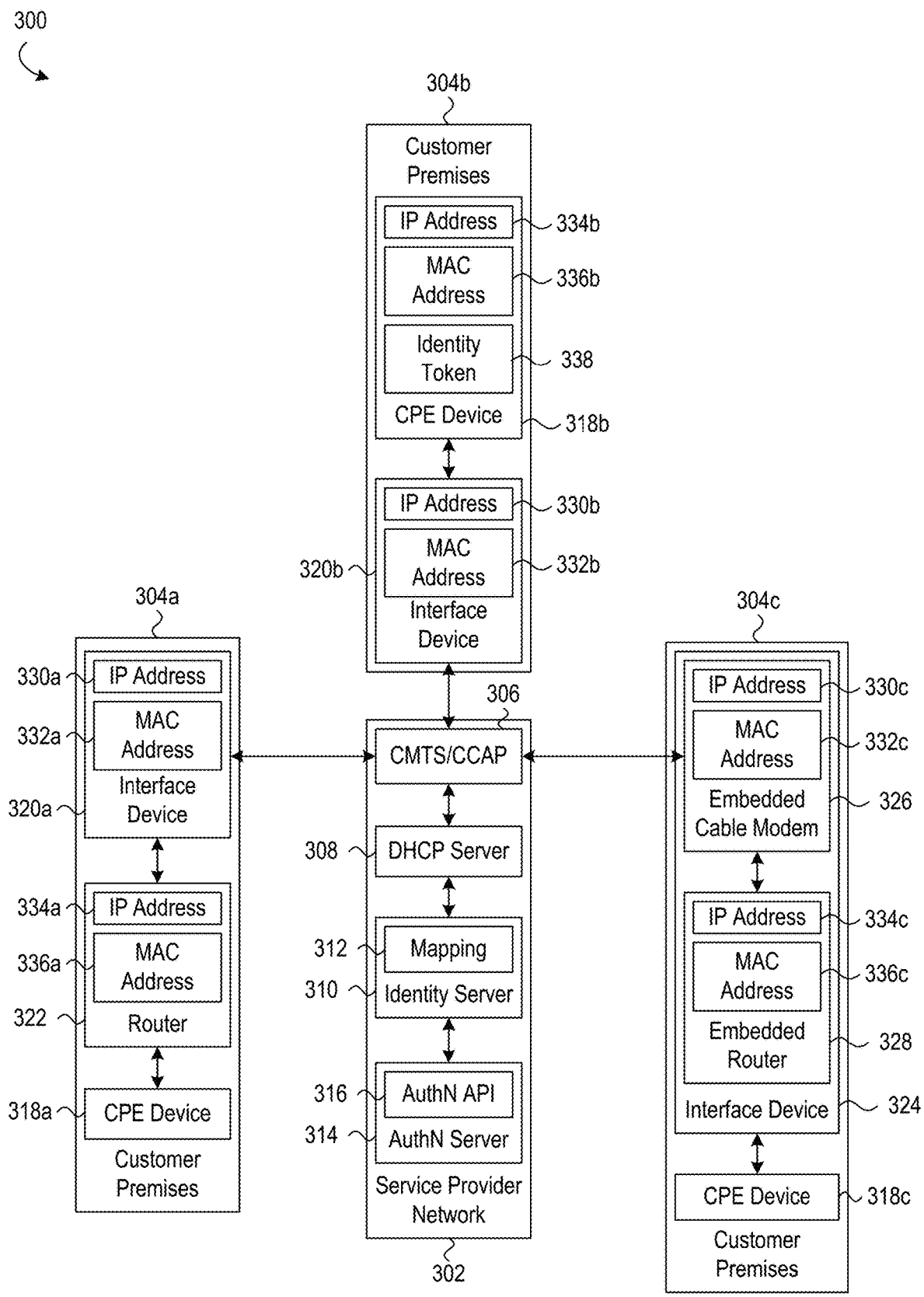
FIG. 3 illustrates an example of an implementation of a system for authenticating computing devices connected to a service provider network in accordance with aspects described herein.

In FIG. 3 an example of an implementation of a system 300 for authenticating computing devices connected to a service provider network is shown. As described above with reference to FIG. 1, a service provider network 302 may be in signal communication with multiple customer premises such as, for example, customer premise 304a, 304b, and 304c (304 generally and 304a-c collectively) as shown in FIG. 3. The service provider network 302, in this example, includes a termination system 306 which may be a CMTS or a Converged Cable Access Platform (CCAP) which combines a CMTS and edge quadrature amplitude modulation features. The service provider network 302, in this example, also includes a Dynamic Host Configuration Protocol (DHCP) server 308 for provisioning network configuration data to devices at the customer premises 304a-c. As seen in FIG. 3, the termination system 306 is in signal communication with the DHCP server 308 at the service provider network 302. The service provider network 302, in this example, additionally includes an operations support systems (OSS) server 310 which, in this example, is an identity server that stores a real-time mapping 312 between network configuration data associated with the devices at the customer premises 304a-c and account information associated with users that access the service provider network 302. As also seen in FIG. 3, the DHCP server 308 is in signal communication with the identity server 310. The service provider network 302, in this example, further includes an authentication (AuthN) server 314 that provides and AuthN API 316 that may be invoked to authenticate the identity of a computing device requesting access to the service provider network 302. As further seen in FIG. 3, the AuthN server 314 is in signal communication with the identity server 310.

Although the DHCP server 308, the identity server 310, and the AuthN server 314 are shown as separate elements at the service provider network 302, alternative implementations may be selectively employed. In general, various elements depicted in FIG. 3 may be implemented or grouped together in any way desired or implemented individually on separate devices. As an example, the functionality of the DHCP server 308, the identity server 310, and the AuthN server 314 may be implemented at one computing device of a service provider network. As another example, the mapping 312 and the AuthN API 316 may be respectively stored at and provided by one computing device of a service provider network that is in signal communication with a DHCP server such as DHCP server 308. Additional and alternative implementations will be appreciated with the benefit of this disclosure.

Each of the customer premises 304a-c, in this example, includes a respective CPE device 318a, 318b, or 318c (318 generally and 318a-c collectively) at which a user accesses the service provider network 302. Although only a single CPE device is shown at each of the customer premises 304a-c, a customer premise may include multiple CPE devices at which users may access the service provider network. CPE devices include computing devices such as personal computers (PCs), desktop computing devices, laptop computing devices, tablet computing devices, palmtop computing devices, cellular telephones (e.g., smartphones and feature phones), network-enabled televisions (e.g., "smart" televisions), network-enabled video game machines, STBs, DVRs, network-enabled audio devices, network-enabled data storage devices, network-enabled home appliances, and other types of computing devices having a network interface suitable for exchanging communications with the service provider network 302. CPE devices may also include network devices deployed at a customer premise such as, e.g., routers (including wireless routers), switches, and access points. A CPE device may also be directly connected to an interface device (e.g., directly connected to a cable modem) rather than via another network device (e.g., a router).

The customer premise 304a, in this example, includes an interface device 320a and a router 322. The interface device 320a may be, for example, a cable modem. As seen in FIG. 3, the interface device 320a is in signal communication with the termination system 306 of the service provider network as well as the router 322. The router 322 is, in turn, in signal communication with the CPE device 318a. The CPE device 318a may thus access the service provider network 302 via the router 322 and the interface device 320a. The customer premise 304b, in this example, includes an interface device 320b (e.g., a cable modem) but omits a router. The CPE device 318b at customer premise 304b, in this example, is directly connected to the interface device 320b.

The customer premise 304c may include an interface device 324 in signal communication with a CPE device 318c. The interface device 324, in this example, includes an embedded cable modem 326 and an embedded router 328. The embedded cable modem 326 and the embedded router 328, in this example, are in signal communication with each other at the interface device 324. The embedded router 328 may be configured to route both wired and wireless communications between the embedded cable modem 326 and the CPE devices such as CPE device 318c at the customer premises 304c.

As noted above, the DHCP server 308 of the service provider network 302 may provision the devices deployed at the customer premises 304a-c with network configuration data such as a dynamic Internet Protocol (IP) address. The DHCP server 308 may provision each of the interface devices 320a and 320b as well as the embedded cable modem 326 with respective IP addresses 330a, 330b, and 330c (330 generally and 330a-c collectively). During the provisioning process, the DHCP server 308 may receive respective media access control (MAC) addresses 332a, 332b, and 332c (332 generally and 332a-c collectively) from the interface devices 320a and 320b and the embedded cable modem 326. The DHCP server 308 may provision respective IP addresses 334a, 334b, and 334c (334 generally and 334a-c collectively) for the router 322 connected to the interface device 320a, the CPE device 318b connected to the interface device 320b, and the embedded router 328 of the interface device 324. The DHCP server 308 may receive respective MAC addresses 336a, 336b, and 336c (336 generally and 336*a-c* collectively) from the router 322, the CPE device 318*b*, and the embedded router 328 of the interface device 324. The network configuration data may include to MAC addresses assigned to CPE devices and interface devices (e.g., cable modems) as well as the IP addresses provisioned for CPE devices and interface devices.

The service provider network may employ a secure network standard to provision an interface device with network configuration data and subsequently authenticate that interface device based on its network configuration data. Suitable network standards that for provisioning network configuration data and authenticating interface devices include the DOCSIS standard, in particular the DOCSIS 1.1 standard. Authentication of an interface device (e.g., a cable modem) in signal communication with the service provider network may be certificate-based. As noted above, the certification information associated with an interface device may be suitable for authenticating the interface device on a network of a service provider network that employs the same network standard, e.g., a DOCSIS network of a service provider network employing the DOCSIS standard. That certification information, however, might not be usable on an overlay network of a service provider network that employs a different network standard, e.g., an IP network of a service provider network. As described in further detail below, however, a service provider network extends the trusted relationship established with the authenticated interface devices to another network employing a different network standard by storing an association between the network configuration data associated with and provisioned for the devices at a customer premise. In other words, the techniques described below result in a transitive trust relationship between an interface device and a computing device directly connected to or embedded in that interface device.

In particular, the service provider network 302 stores respective associations between the network configuration data associated with and provisioned for the devices deployed at a customer premises. More particularly, the service provided network tightly couples the cable modem IP address 330, the cable modem MAC address 332, the CPE IP address 334, and the CPE MAC address 336. The identity server 310 stores this network configuration data in the mapping 312 such that the values are associated with each other as well as with the user account of the user (or customer) associated with the interface devices 320*a-b* and 324 respectively deployed at the customer premises 304*a-c*. The mapping 312 may be, for example, a table of a database where the columns of the table correspond to user account data elements (e.g., user account number, mailing address, first and last customer name, etc.) and network configuration data elements (e.g., IP and MAC addresses for the interface and CPE devices). The values of the user account information and network configuration data thus correspond to the data items stored in the mapping 312 at the identity server 310. Each entry of the mapping 312 (e.g., each row of the database table) may correspond to one association between the user account and the network configuration data. The DHCP server 308, in this example, updates the mapping 312 as part of the provisioning process The update from the DHCP server 308, in this example, includes the network configuration data associated with and provisioned for the interface device and CPE device, e.g., the respective MAC addresses of the interface device and the CPE device as well as the respective IP addresses provisioned for the interface device and CPE device. Updating the mapping 312, in this example, includes both adding a new entry to the mapping (e.g., inserting a row into the database table), modifying an existing entry in the mapping (e.g., modifying an existing row of the database table), and deleting that entry from the mapping (e.g., deleting a row of the database table). Storage of the network configuration data at the identity server 310 will be discussed in further detail below with reference to FIG. 5.

The identity server 310, in this example, is configured to generate a secure identity token based on the network configuration data respectively associated with and provisioned for the interface device and the CPE device deployed at a customer premise. The identity server 310 provides the identity token generated to a CPE device for storage. In FIG. 3, the CPE device 318*b* stores an identity token 338 that has been generated based on the network configuration data associated with and provisioned for that CPE device and the interface device 320*b*. The CPE device 318 may thus provide the identity token 338 to the service provider network 302 during subsequent service and access requests, and the service provider network may authenticate the CPE device based, in part, on the identity token provided. The identity token 338, in this example, encodes the MAC address 332*b* assigned to and the IP address 330*b* provisioned for the authenticated interface device 320*b*. The identity token 338 also encodes MAC address 336*b* assigned to and the IP address 334*b* provisioned for the CPE device 318*b*. It will be recognized with the benefit of this disclosure that each CPE device that is provisioned with network configuration data via the authenticated interface device 320*b* may receive its own individual identity token. In some example implementations, a CPE device itself may additionally or alternatively generate the identity token based on the network configuration data associated with the CPE device and the interface device. In these example implementations, the CPE device may transmit the identity token generated to the identity server for storage.

An identity token may also encode additional information. In some example implementations, an identity token may also encode a unique identifier associated with a user account, e.g., the user account associated with the interface device (e.g., cable modem) deployed at the customer premises. The unique identifier may correspond to an individual user or a group of users. Accordingly examples of user identifiers include a username, an email address, an account number, or a mailing address of the customer premise at which the interface device is deployed. The identity token may also encode a timestamp that indicates an expiration date of the identity token. CPE devices that provide expired identity tokens may be denied authentication.

In some example implementations, the identity server 310 may generate an identity token by hashing each of the values it encodes. In other words, an identity token may be, for example, a hash of a CPE IP address, CPE MAC address, cable modem IP address, cable modem MAC address, unique identifier, and timestamp. The identity server 310 may also hash these values with a randomized text string. The identity server 310 may store the randomized text string with the other network configuration data stored in the mapping 312. The identity server 310 may thus rehash the stored network configuration data with randomized text string (i.e., a salt) to recreate the identity token when authenticating an identity token received in an authentication request. In some example implementations, the mapping 312 may store the hashed value of the network configuration data rather than the network configuration data itself. If the hash is salted, the mapping 312 may also store the salt used to generate the hash. The identity server 310 may thus compare identity tokens to determine whether the network configuration data encoded in an identity token provided by a CPE device matches the network configuration data stored at the identity server for that CPE device.

Although not shown in FIG. 3, the router 322 may store an identity token generated based on the network configuration data associated with and provisioned for that router and the interface device 320a. The embedded router 328 may store an identity token based on the network configuration data associated with and provisioned for that router and the embedded cable modem 326.

By storing the network configuration data associated with a CPE device and an authenticated interface device, the service provider network 302 may advantageously authenticate that CPE device on another network that employs a different network standard. In one example, the service provider network 302 may authenticate the interface devices 320 and 324 on a DOCSIS network of the service provider network and leverage that authentication to subsequently authenticate CPE devices on an IP network provided by the service provider network. In particular, network elements of the service provider network 302 (e.g., content servers, application servers, web servers, access gateways, etc.) may authenticate a CPE device based on the network configuration data stored at the identity server 310 in the mapping 312. A network element of the service provider network 302 may request authentication of a CPE device in response to receipt of a service request or an access request from the CPE device. A service request as used herein refers to a request for one or more services provided by the service provider network, e.g., a request for content provided by the service provider network, a Quality of Service (QoS) request to prioritize one or more communications across the service provider network, a generic routing encapsulation (GRE) request to tunnel communications through the service provider network, etc.

The AuthN server 314 facilitates authentication of a CPE device by providing the AuthN API 316 which the network elements of the service provider network 302 may invoke to authenticate the CPE device. The AuthN API 316, in this example, defines one or more function calls and corresponding parameters for authenticating a CPE device based, in part, on network configuration data associated with and provisioned for that CPE device. An authentication request function of the AuthN API 316 may, for example, specify parameters that include i) an identity token received at the network element from the CPE device, and ii) a source IP address included in a communication received at the network element from the CPE device. The AuthN server 314 then submits a request to the identity server 310 to compare the network configuration data received from the CPE device (e.g., in the identity token) to the network configuration data stored at the identity server 310 in the mapping 312.

The identity server 310, in this example, is configured to retrieve the network configuration data stored in the mapping 312 that is associated with the source IP address received from the AuthN server 314, extract the network configuration data encoded by the identity token received from the AuthN server, and compare the retrieved network configuration data to the extracted network configuration data. If the stored network configuration data matches the network configuration data in the identity token received, then the identity server 310, in this example, provides a response to the AuthN server 314 indicating that the CPE device that provided the identity token has been authenticated. More particularly, the identity server 310 authenticates the CPE device when the stored MAC and IP addresses for an interface device and a CPE device match those in the identity token received from the AuthN server 314 in an authentication request. If the stored network configuration data does not match the network configuration data in the identity token received from the AuthN server, the response provided by the identity server 310 may indicate that the CPE device could not be authenticated based on the identity token provided. The identity server 310 may also indicate that the CPE device could not be authenticated when the identity server 310 cannot locate network configuration data that is associated with the source IP address of that CPE device.

The AuthN server 314, in this example, also facilitates the retrieval of information of a user account associated with an entry in the mapping 312 of the identity server 310. As another example, an information request function of the AuthN API 316 may, for example, specify parameters that include i) an identity token received at the network element from the CPE device, ii) a source IP address included in a communication received at the network element from the CPE device, and iii) an identification of a data field for which a corresponding data item is requested. The requested data item may be, for example, stored in a data field of a user account record. Examples include an account number of the user account, a username of the user account, an email address for the user account, a mailing address for the user account, and other types of data items that will be appreciated with the benefit of this disclosure. A network element may invoke the information request function and provide the specified parameters, e.g., an identity token received from the CPE device, a source IP address of the CPE device, and a data field for a desired data item. The AuthN server 314 may then submit a request to the identity server 310 which authenticates the CPE device based on the identity token provided as discussed above and, if successfully authenticated, retrieves the requested data item and provides it to the AuthN server. The AuthN server may then provide the requested data item to the network element.

Alternatively or additionally, an identity server of a service provider network may provide an AuthN API rather than an AuthN server. Accordingly a network element may submit authentication requests and information requests to the identity server directly rather than via an AuthN server. Handling authentication requests and information requests via an AuthN server, however, may be advantageous where the service provider network permits third-party service provider network elements residing outside the service provider network to submit authentication requests and information requests. Third-party authentication requests and information requests are discussed in further detail below with reference to FIG. 4 and FIG. 9.

Figure 4:
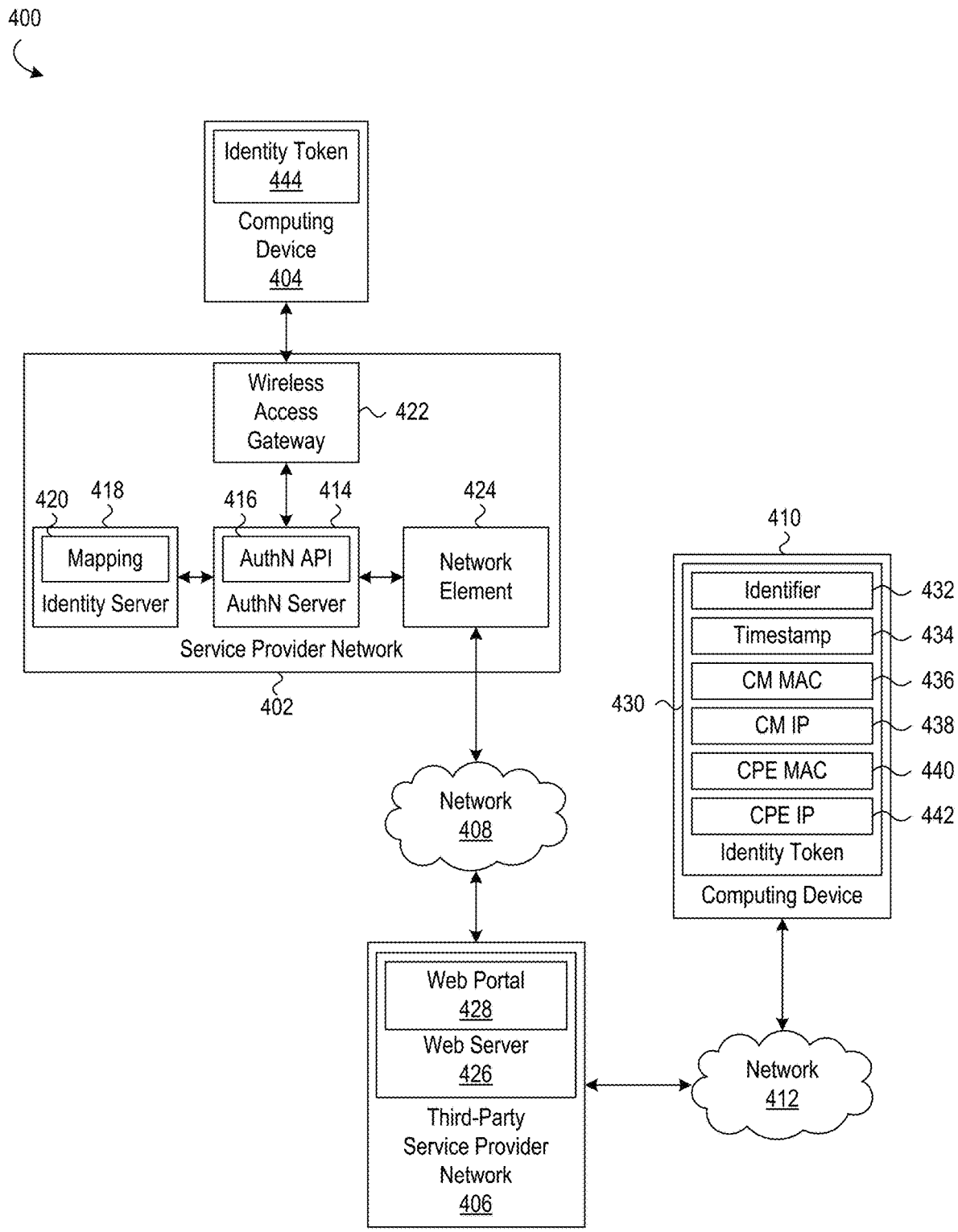
FIG. 4 also illustrates another example of an implementation of a system for authenticating computing devices connected to a service provider network in accordance with aspects described herein.

FIG. 4 shows another example of an implementation of a system 400 for authenticating computing devices connected to a service provider network. As seen in FIG. 4, a service provider network 402 is in signal communication with a computing device 404 and in signal communication with a third-party service provider network 406 via a network 408. As also seen in FIG. 4, the third-party service provider network 406 is also in signal communication with a computing device 410 via a network 412. The service provider network 402 may be the same as or at least similar to the service provider network 302 described above with reference to FIG. 3. For clarity, not all of the components of the service provider network 402 are illustrated in FIG. 4. The computing devices 404 and 410 may be the same as or at least similar to the CPE devices 318 described above with reference to FIG. 3. The networks 408 and 412 may include wired networks, wireless networks, local area networks (LANs), and wide area networks (WANs) such as cellular networks and the Internet.

The service provider network 402, in this example, includes an AuthN server 414 that provides an AuthN API 416 as well as an identity server 418 that stores a mapping 420 between network configuration data and user account information as described above. The AuthN server 414 and AuthN API 416 may be the same as or at least similar to the AuthN server 314 and the AuthN API 316 respectively described above with reference to FIG. 3. The identity server 418 and the mapping 420 may be the same as or at least similar to the identity server 310 and the mapping 312 respectively described above with reference to FIG. 3. The service provider network 402, in this example, includes a wireless access gateway (WAG) 422 and a network element 424. As seen in FIG. 4, the WAG 422 and network element 424 are each in signal communication with the AuthN server 414 which is, in turn, in signal communication with the identity server 418.

The WAG 422, in this example, provides computing devices such as computing device 404 wireless access to the service provider network. Through the WAG 422, the computing device 404 may receive notifications from a push notification server (e.g., push notification server 105 in FIG. 1), receive content from a content delivery server (e.g., content server 106 in FIG. 1) of a content delivery network of the service provider network 402, or access an application provided by an application server (e.g., application server 107 in FIG. 1) of the service provider network 402. The service provider network may also connect the computing device 404 to a WAN such as the Internet via the WAG 422. As described above, the network element 424 may be, for example, a web server, an application server, a content delivery server, etc.

The network element 424 may provide, e.g., an AuthN web service for third-party service providers to submit authentication requests and information requests to the service provider network 402. A third-party service provider network element may invoke the AuthN web service, and the AuthN web service may be configured to, in turn, invoke the AuthN API 416 of the AuthN server 414. Publishing the authentication capabilities of the service provider network 402 to third-party service provider networks provides a number of advantages. One advantage allows a third-party service provider network to determine whether a service request originated from a CPE device behind an authenticated interface device (e.g., an authenticated cable modem). If so, the third-party service provider network may omit or otherwise bypass additional authentication of the CPE device in advance of permitting access to a service provided by the third-party service provider. As seen in FIG. 4, for example, the third-party service provider network 406, in this example, includes a remotely-located web server 426 that provides a web portal 428 (e.g., one or more web pages). The web portal 428 may be accessible to the computing device 410 via the network 412 (e.g., the Internet). Security features implemented by the web portal 428 may require a user that operates the computing device 410 to provide login credentials (e.g., a username and password) to access the web portal. If, however, the third-party service provider network 406 can determine that the computing device 410 is accessing the web portal 428 via an authenticated interface device (e.g., an authenticated cable modem), then the web portal may bypass the login step and provide the computing device with immediate access.

The third-party service provider network 406 may authenticate the computing device 410 using an identity token 430 stored at the computing device. As described above, the identity token 430 may be generated when a service provider network provisioned the computing device 410 with network configuration data via an authenticated interface device (e.g., an authenticated cable modem). The third-party service provider network 406 may thus challenge the computing device 410 to provide the identity token 430 in response to receipt from the computing device of a request to access the third-party service provider network. The third-party service provider network 406 may thus request the service provider network 402 to authentication the computing device 410 based on the identity token 430 provided and the network configuration data stored in the mapping 420 of the identity server 418 as described above.

The identity token 430, in this example, encodes an identifier 432 (e.g., a username, a user account number, a mailing address, etc.), a timestamp 434 that indicates whether the identity token has expired, a MAC address 436 for an interface device (e.g., a cable modem), an IP address 438 for the interface device, a MAC address 440 for a CPE device, and an IP address 442 for the CPE device. In some example implementations, an identity token may also include the digital certificate associated with the interface device through which the CPE device was provisioned with network configuration data. As noted above, the identity token 430 may be a hash of the identifier 432, the timestamp 434, and the network configuration data 436-442. The computing device 404 may include an identity token 444 that encodes at least some of the same type of information as the identity token 430, e.g., at least the network configuration data. The WAG 422 may similarly challenge the computing device 404 for the identity token 444 in response to receipt of a request to access the service provider network 402 via the WAG. Authenticating CPE devices will be discussed in further detail below with reference to FIGS. 6-9.

Referring now to FIG. 5, an example of an implementation of a mapping 500 between network configuration data and user account information is shown. The mapping 500, in this example, is a table wherein each row represents one instance of a mapping between information associated with a user account and network configuration data associated with and provisioned for devices deployed at a customer premise that is associated with that user account. The columns of the table thus correspond to the date fields of the mapping 500, and the values stored at those columns in each row thus correspond to the data items of the data fields. The mapping 500, in this example, includes the following data fields: an account number 502, a name 504 of an individual associated with the account (e.g., first and last name); a mailing address 506 of the customer premise at which an interface device (e.g., a cable modem) associated with the account are deployed; a serial number 508 for the interface device deployed at the customer premise; an identification of a set of authorized (AuthZ) services 510 for the account; and network configuration data associated with and provisioned for the devices deployed at the customer premises. As described above, the network configuration data stored in the mapping 500, in this example, includes a MAC address 512 for an interface device (e.g., a cable modem) deployed at the customer premise, an IP address 514 provisioned for the interface device deployed at the customer premise, a MAC address 516 for a CPE device deployed at the customer premise, and an IP address 518 provisioned for the CPE device. The MAC addresses and IP addresses of the computing device and the authenticated interface device mapped and associated with each other in an entry of the mapping 500 may be collectively referred to as associated network configuration data. In other words, the network configuration data of a computing device and the network configuration data of the authenticated interface device may be collectively referred to as associated network configuration data when the respective network configuration data are added to the mapping of an identity server of a service provider network. The AuthZ services may be, for example, premium channels the account subscribes to, a bandwidth level the account subscribes to, and other types of AuthZ services that will be appreciated with the benefit of this disclosure.

Multiple interface devices (e.g., multiple cable modems) may be deployed at a customer premise. Accordingly a mapping may include multiple entries for the same account wherein those entries respectively identify one of the interface devices deployed at a customer premise. A service provider network may also provision multiple CPE devices at a customer premise with network configuration data via an authenticated interface device (e.g., an authenticated cable modem). Accordingly a mapping may also include multiple entries for the same account wherein those entries respectively identify network configuration data associated with and provisioned for one of the CPE devices deployed at the customer premises. An identity server of a service provider network may thus generate an identity token for each CPE device listed in the mapping stored at the identity server. In some example implementations, the service provider may also store the identity token generated at the identity server.

Figure 6:
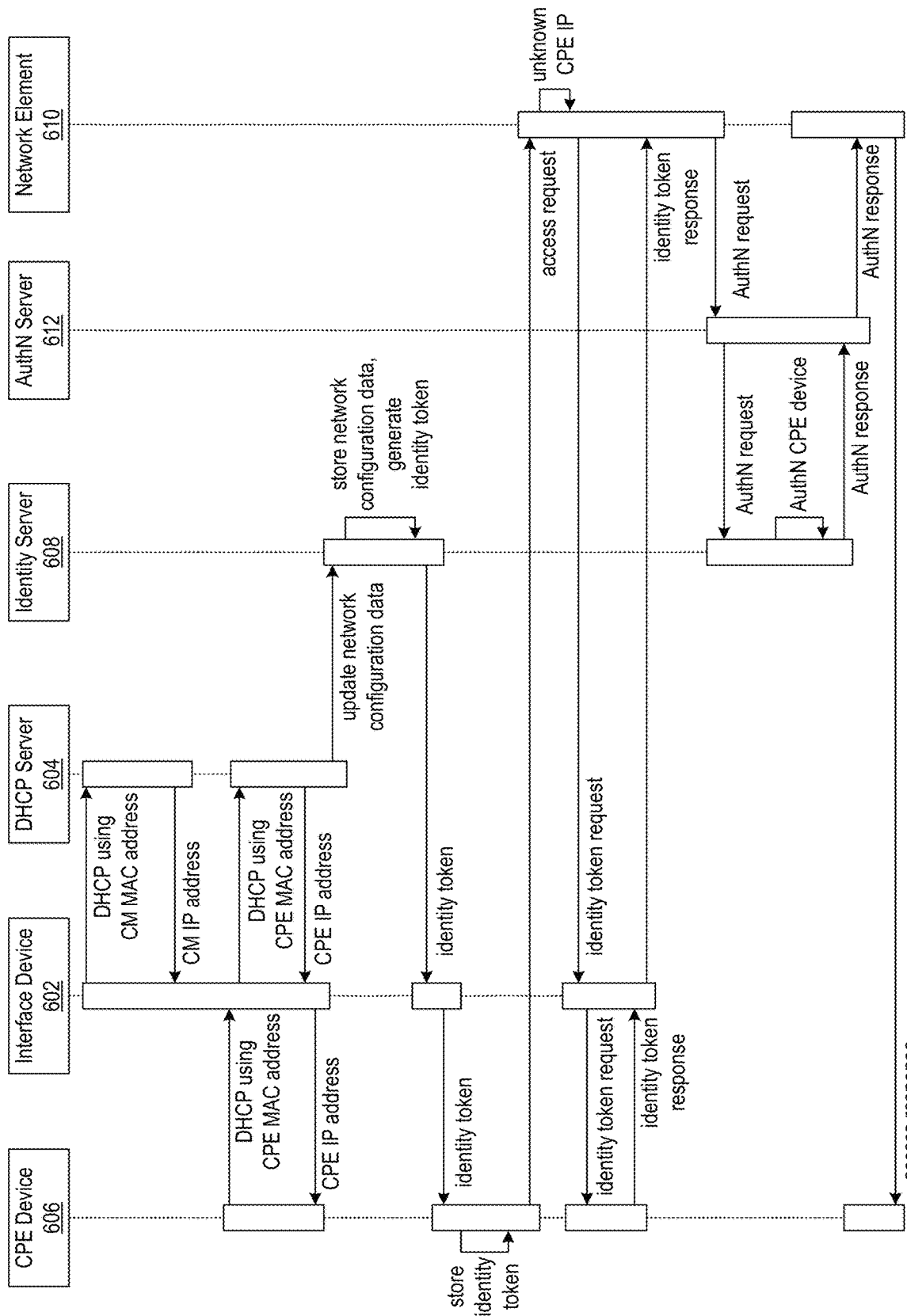
FIG. 6 illustrates a sequence diagram of an example authentication procedure in accordance with aspects described herein.

Referring now to FIG. 6, a sequence diagram of an example authentication procedure in accordance with aspects described herein is shown. In this example, an interface device 602 (e.g., a cable modem) submits a DHCP request with the MAC address of the cable modem to the DHCP server 604 which provisions the cable modem an IP address in response. Provisioning the interface device 602 with an IP address may include authenticating the cable modem, e.g., using the DOCSIS standard. Having provisioned the interface device 602 with an IP address, a CPE device 606 may also submit, via the cable modem, a DHCP request with the MAC address of the CPE device to the DHCP server 604 which provisions the CPE device with an IP address in response.

After provisioning the interface device 602 and the CPE device 606, the DHCP server 604 submits an update to the identity server with the network configuration data. The identity server 608 stores the network configuration data and generates an identity token based on the network configuration data as described above. The identity server 608 then transmits the identity token back to the CPE device 606 which stores the identity token upon receipt. The identity token thus allows the CPE device 606 to demonstrate to a network element 610 of a service provider network that the CPE device is operating behind an authenticated and trusted interface device 602 when requesting access to that service provider network. Since the DHCP server 604 dynamically provisions an IP address to the CPE device 606, the identity server 608 may include old network configuration data previously associated with the CPE device. Accordingly upon receipt of new network configuration data from the DHCP server 604, the identity server 608 may be configured to delete the old network configuration data and any corresponding identity token associated with the CPE device 606 when updating the new network configuration data received from the DHCP server and generating a new identity token.

Accordingly, if the CPE device 606 submits an access request to the network element 610, and if the network element does not recognize the source IP address of the CPE device, then the network element challenges the CPE device to provide the identity token it received when provisioned with network configuration data via the authenticated interface device 602. If the CPE device 606 cannot provide the requested identity token, then the network element 610 may reject the access request. In some example implementations, the network element 610 and CPE device 606 may utilize the Internet Control Message Protocol (ICMP) to conduct the challenge-response process. In particular, ICMPv4 may be utilize for the identity token challenge-response process. If the CPE device 606 does respond with the identity token, however, then the network element 610 submits an AuthN response to the AuthN server 612 with the identity token received and the source IP address of the CPE device. The AuthN server 612, in turn, submits an AuthN request to the identity server 608 requesting validation of the identity token received from the CPE device 606.

The identity server 608 retrieves from the mapping the network configuration data associated with the source IP address and compares the retrieved network configuration data to the network configuration data encoded in the identity token received from the CPE device 606 in order to authenticate the CPE device. As noted above, the identity server 608 may be configured to compare respective hashes of the network configuration data to determine whether the received identity token matches a stored identity token. The identity server 608 submits an AuthN response to the AuthN server 612 which forwards the AuthN response back to the network element 610. If the AuthN response indicates the CPE device 606 could not be authenticated (e.g., the identity tokens did not match), then the network element 610 may transmit an access response to the CPE device indicating that access to the service provider network has been denied. If the AuthN response indicates the CPE device 606 was successfully authenticated, however, the network element 610 may transmit an access response to the CPE device indicating that access to the service provider network has been granted.

Figure 7:
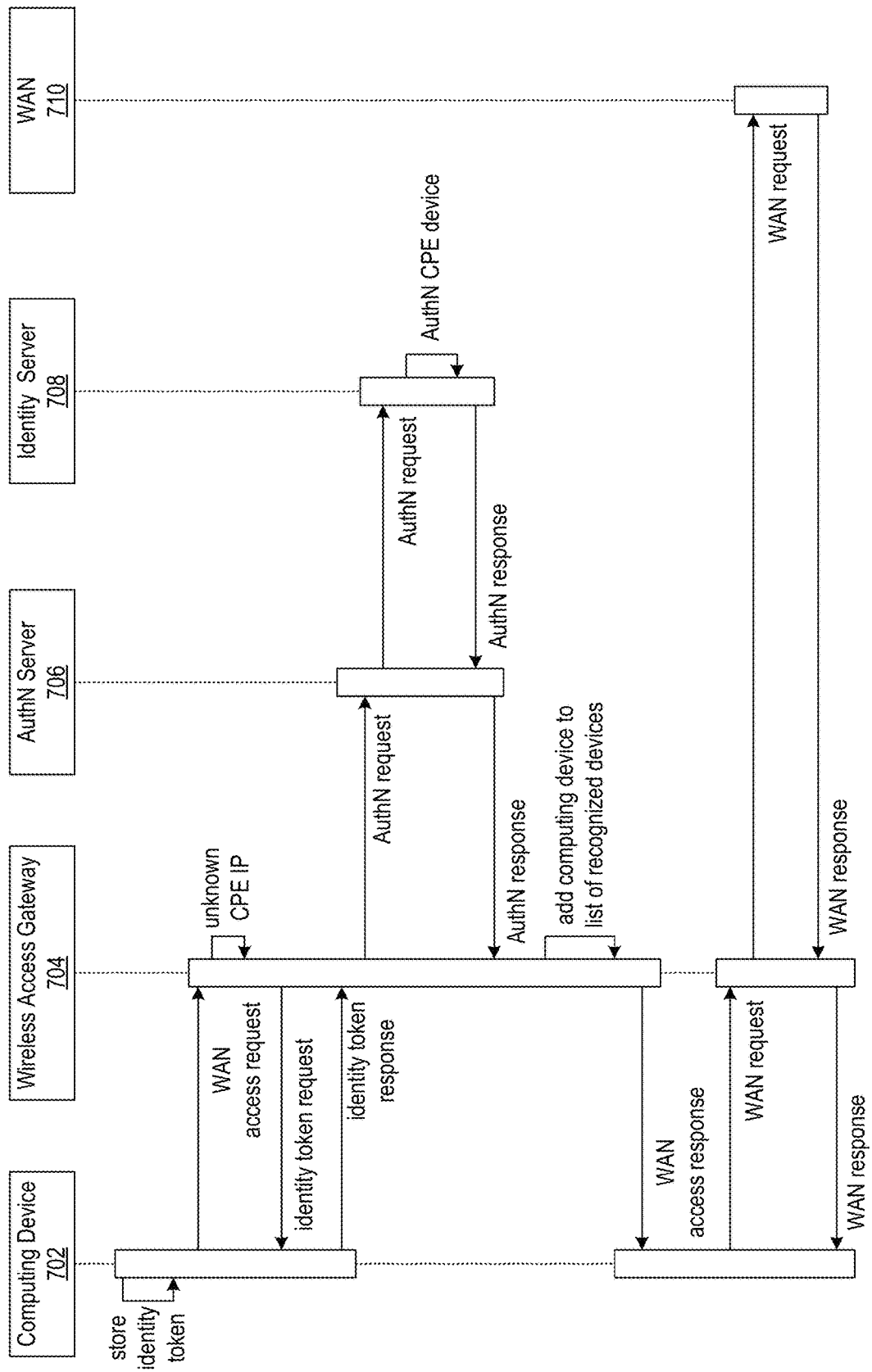
FIG. 7 illustrates a sequence diagram for a first example use case in accordance with aspects described herein.
Figure 8:
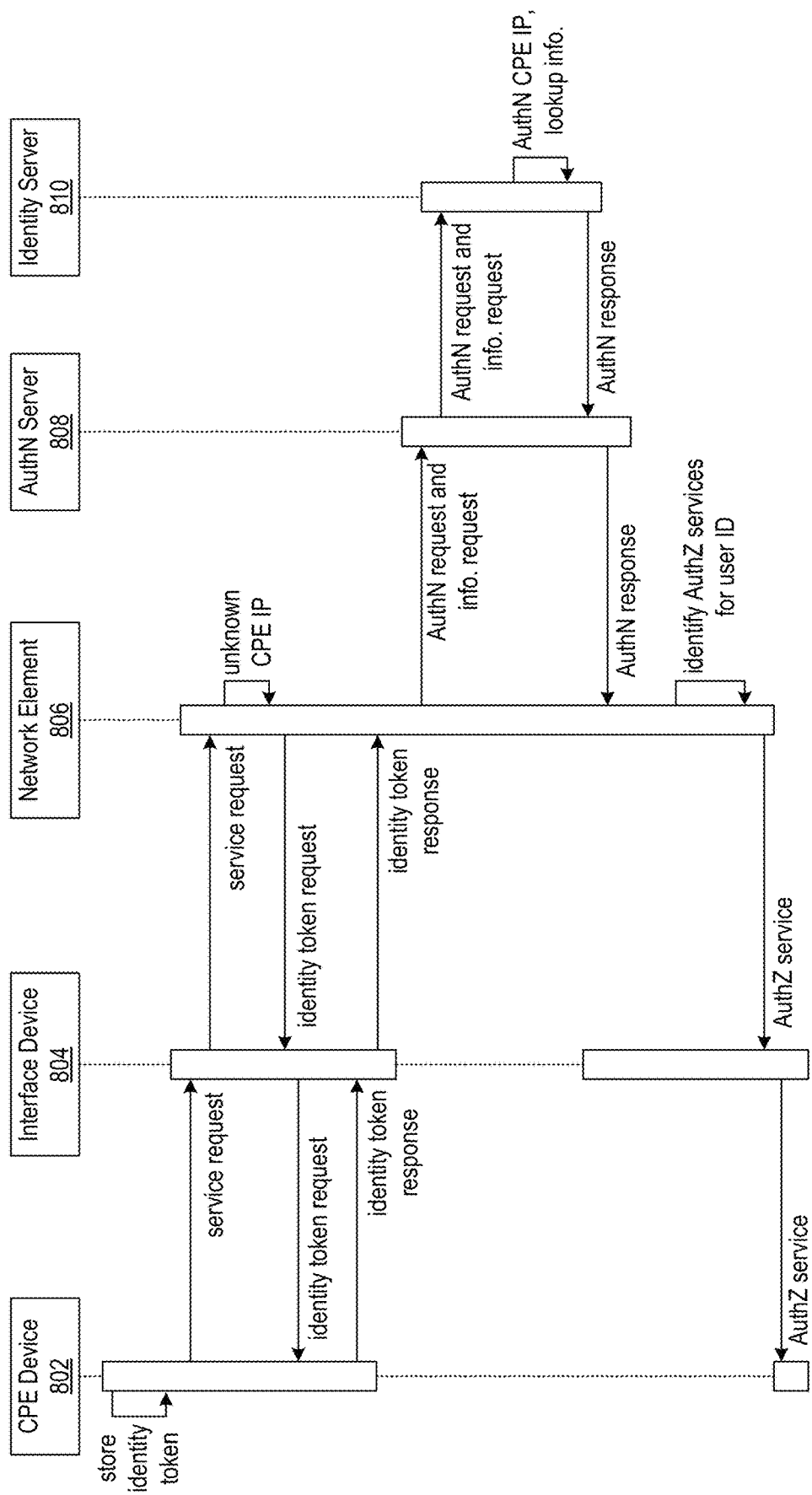
FIG. 8 illustrates a sequence diagram for a second example use case in accordance with aspects described herein.
Figure 9:
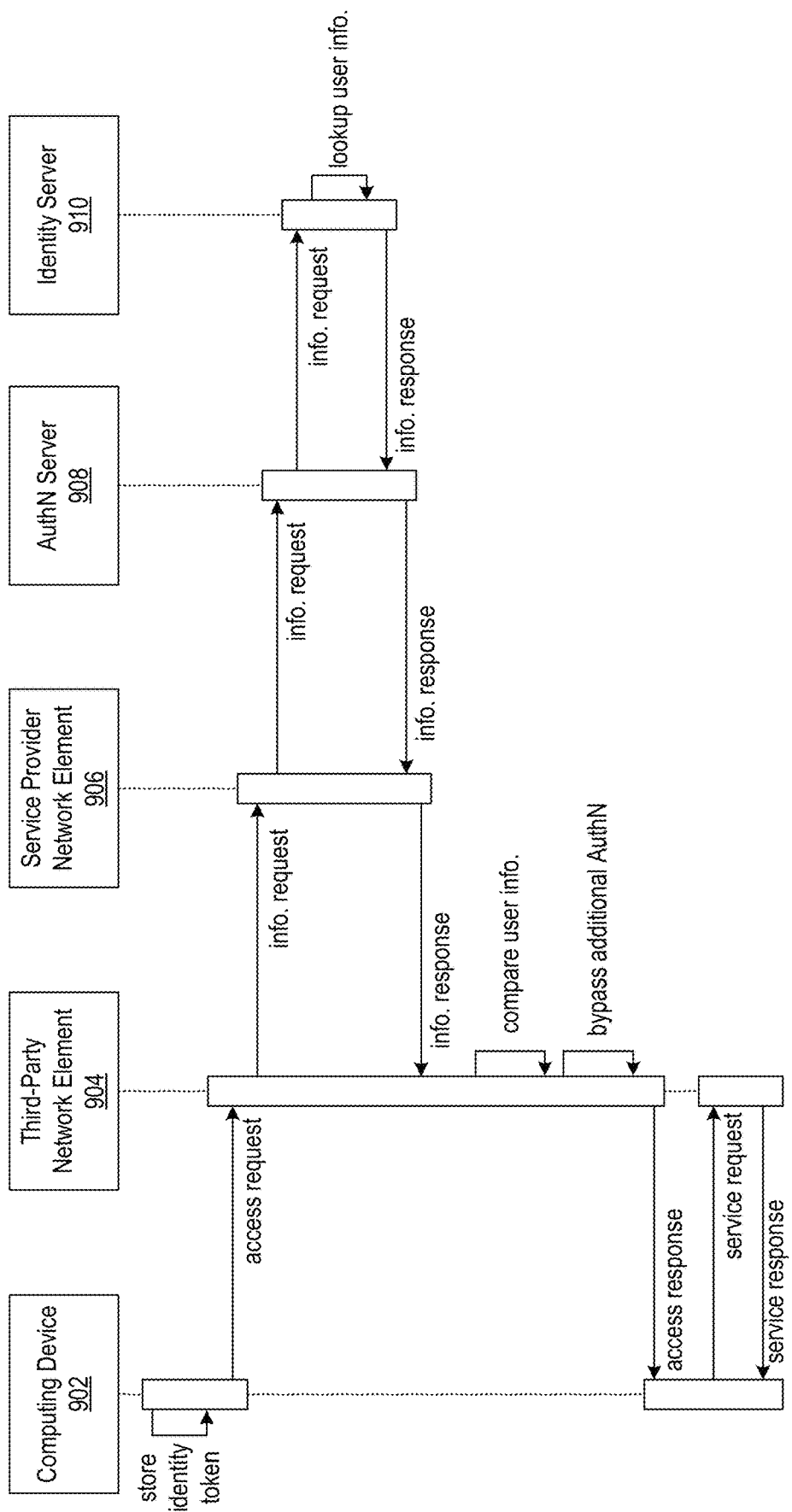
FIG. 9 illustrates a sequence diagram for a third example use case in accordance with aspects described herein.

FIGS. 7-9 illustrate sequence diagrams corresponding to example uses cases that involve authenticating a CPE device in accordance with aspects described herein.

In FIG. 7, a sequence diagram for a first use case is illustrated in which a WAG of a service provider network authenticates a computing device requesting access to a WAN (e.g., the Internet) via the WAG. In FIG. 7, a computing device 702 receives and stores an identity token that encodes network configuration data associated with and provisioned for the computing device via a trusted authenticated interface device as described above with reference to FIG. 6. FIG. 7 illustrates an example use case in which a personal computing device may obtain access to a service provide network via an access gateway using an identity token provided to that computing device as evidence of the trusted relationship between the service provider and the interface device used to initially provision the computing device with network configuration data. The computing device 702 submits to a WAG 704 a request to access a WAN (e.g., the Internet) via the WAG. The request may, in some example implementations, be a GRE request. It will be recognized that the computing device 702 might not be located at the customer premise when submitting the request to the WAG 704. As an example, a service provider may deploy multiple WAGs outside of the customer premise that portable CPE devices (e.g., laptop computing devices, tablet computing devices, cellular telephones, hand-held video game machines, etc.) may utilize when removed from the customer premise.

If the WAG 704 does not recognize the source IP address associated with the computing device 702, then the WAG challenges the computing device to provide the identity token. The request to provide the identity token from the WAG and the corresponding response that includes the requested identity token from the computing device 702 may be, in some example implementations, a GRE request and a GRE response respectively. Upon receipt of the identity token from the computing device 702 in response to the challenge, the WAG 704 submits an AuthN request to the AuthN server 706. The AuthN request, in this example, includes the identity token received from the computing device 702 and the source IP address of the computing device. The AuthN server 706, in turn, submits an AuthN request to the identity server 708 requesting validation of the identity token received from the computing device 702.

As described above, the identity server 708 authenticates the computing device 702 based on the identity token received and the network configuration data stored in the mapping for the source IP address. The identity server 708 provides an AuthN response to the AuthN server 706 indicating whether the computing device was authenticated, and the AuthN server forwards the AuthN response to the WAG 704. If the identity server 708 could not authenticate the computing device 702, then the WAG 704 may provide a response to the computing device 702 indicating that the access request has been denied. If, however, the identity server 708 successfully authenticated the computing device 702, then the WAG 704 may add the computing device to a list of recognized devices (e.g., by storing the source IP address and/or the MAC address of the computing device until the cache expires) and provide a response to the computing device indicating that the access request has been granted. The computing device 702 may thus submit requests to and receive responses from a WAN 710 via the WAG 704.

Having added the computing device 702 to the list of recognized devices, the WAG 704 may subsequently grant the computing device access to the network without challenging the computing device for the identity token. The WAG 704 may also notify other WAGs of the service provider network that the computing device 702 has been authenticated such that the computing device may also access the service provider network via those other WAGs without being challenged for the identity token. The WAG 704 may, for example, provide the entire list of the recognized computing devices to another WAG or just information identifying the computing device 702 (e.g., the source IP address and/or the MAC address of the computing device). In some example implementations, the WAGs of a service provider network may exchange their respective lists of recognized computing device which may occur automatically at regular intervals (e.g., once an hour, once a day, etc.) or in response to updating the list of recognized device upon successfully authenticating a computing device. The WAG 704 may share the list of recognized devices (or at least a portion of the list) with a subset of the other WAGs of the service provider network, for example, those WAGs that are in relatively close physical proximity with the WAG. As an example, the WAG 704 may share the list of recognized devices with other WAGs whose broadcast ranges overlap or are adjacent to the broadcast range of the WAG. The WAG 704 may also share the list of recognized devices with other WAGs that are within a predetermined distance of the WAG (e.g., 100 yards/meters/feet, 500 yards/meters/feet, 1000 yards/meters/feet, etc.) or within an area defined by a predetermined boundary (e.g., a zip code, city, state, etc.). In this way, the authenticated computing device 702 may be able to advantageously roam through areas serviced by different WAGs and respectively access the service provider network via those WAGs without being repeatedly challenged for the identity token.

In FIG. 8, a sequence diagram for a second use case is illustrated in which a network element of a service provider authenticates a computing device and identifies services that computing device is authorized to access. In FIG. 8, a CPE device 802 receives and stores an identity token that encodes network configuration data associated with and provisioned for the CPE device via an authenticated interface device 804 (e.g., a cable modem) as described above. The CPE device 802, in this example, submits a service request to a network element 806 of a service provider network via the interface device 804. If the network element 806 does not recognize the source IP address of the CPE device 802, then the network element 806 challenges the computing device to provide the identity token. Upon receipt of the identity token from the CPE device 802 in response to the challenge, the network element 806 submits an AuthN request and an information request to the AuthN server 808. The AuthN request, in this example, includes the identity token received from the CPE device 802 and the source IP address of the CPE device. The information request, in this example, identifies a data field associated with a user account (e.g., an account number, username, list of authorized services, etc.) The AuthN server 808, in turn, submits an AuthN request and an information request to the identity server 810 requesting validation of the identity token provided by the CPE device 802 and retrieval of the data item for the data field identified.

As described above, the identity server 810 authenticates the CPE device 802 based on the identity token received and the network configuration data stored in the mapping with the source IP address. If the identity server 810 successfully validates the identity token provided by the CPE device 802, then the identity server retrieves the data item for the data field identified in the information request. The identity server 810, in this example, includes the data item retrieved in a response sent back to the AuthN server 808 which may forward the response back to the network element 806. Upon receipt of the response, the network element may identify otherwise determine services the CPE device 802 is authorized to receive. If the service request submitted by the CPE device 802 is a service the CPE device is authorized to receive, then the network element 806 may provide the authorized service to the CPE device via the interface device 804.

In FIG. 9, a sequence diagram for a third use case is illustrated in which a network element of a third-party service provider network requests authentication of a computing device in order to determine whether the computing device is operating behind a trusted and authenticated interface device (e.g., a trusted and authenticated cable modem). In FIG. 9 a computing device 902 receives and stores an identity token that encodes network configuration data associated with and provisioned for the computing device via an authenticated interface device as described above. The computing device 902, in this example, submits an access request to a third-party network element 904 (e.g., a web server) of a third-party service provider network. Although not shown in FIG. 9, the computing device 902 may submit the access request to the third-party network element via an authenticated interface device (e.g., an authenticated cable modem), a wireless access gateway, or another type of network gateway. The computing device 902 may also submit the access request to the third-party network element 904 across a WAN such as the Internet.

The access request may include a unique identifier such as, e.g., a username. The third-party network element 904 may then determine whether the computing device 902 is operating behind an authenticated interface device (e.g., an authenticated cable modem) in order to determine whether additional authentication of the computing device should be performed before granting the computing device access to the third-party service provider network. To determine whether additional authentication should be performed, the third-party network element 904 submits an information request to a service provider network element 906 of the service provider network that provisioned the computing device 902 with the network configuration information and stores the mapping between the network configuration information of the computing device and the authenticated interface device. The information request identifies the source IP address of the computing device 902 and identifies a data field associated with a user account (e.g., a mailing address) that the third-party network element 904 uses to determine whether additional authentication should be performed.

The service provider network element 906, in this example, submits an information request to the AuthN server 908 which, in turn, submits an information request to the identity server 910. These information requests also identify the source IP address of the computing device 902 and the data field identified by the third-party network element 904. In response to receipt of the information request, the identity server 910 may lookup the data item for the data field identified based on the source IP address identified in the information request. The identity server then provides the requested data item to the AuthN server in a response which forwards the response to the service provider network element 906 which, in turn, provides the response with the data item requested to the third-party network element 904.

Upon receipt of the requested data item, the third-party network element compares the data item received to a data item stored at the third-party service provider network. The stored data item is associated with the unique identifier received from the computing device 902 in the service request. If the retrieved data item matches the stored data item, then the third-party network element 904 bypasses additional authentication and permits the computing device 902 to access the third-party service provider network. In other words, the third-party network element 904 bypasses additional authentication of the computing device 902 in response to determining that the computing device is operating from behind an authenticated interface device (e.g., an authenticated cable modem). The determination to bypass additional authentication is based on a comparison of a data item stored at the third-party service provider network to a data item associated with network configuration data for the computing device that maps to network configuration data for the authenticated interface device. The third-party network element 904 provides a response to the computing device indicating whether the computing device has been granted access to the third-party service provider network or whether additional authentication is needed. Additional authentication may include, for example, requiring the computing device 902 to provide login credentials (e.g., a username and password) as well as requiring the computing device to perform two-factor authentication. If the computing device 902 has been granted access to the third-party service provider network (or once the additional authentication is performed), the computing device may submit service requests to and receive service responses from the third-party service provider network via the third-party network element 904.

As a practical example, the computing device 902 may provide a username in an access request to the third-party network element 904. The third-party service provider network may store mailing addresses for user accounts that are authorized to access the third-party service provider network. The third-party network element may thus request the mailing address associated with the interface device that maps to the source IP address of the computing device 902 at the identity server 910 of the service provider network. Upon receipt of the mailing address associated with the source IP address, the third-party network element may compare that mailing address to a mailing address associated with username provided by the computing device. If the mailing addresses match, then the third-party network element 904 may determine that the computing device 902 is operating from behind an authenticated cable modem at the customer premise and thus bypass additional authentication (e.g., requesting a password or requiring two-factor authentication). Instead the third-party network element may grant the computing device 902 access to a web portal that provides services for the user account. Additional practical examples will be appreciated with the benefit of this disclosure.

Figure 10:
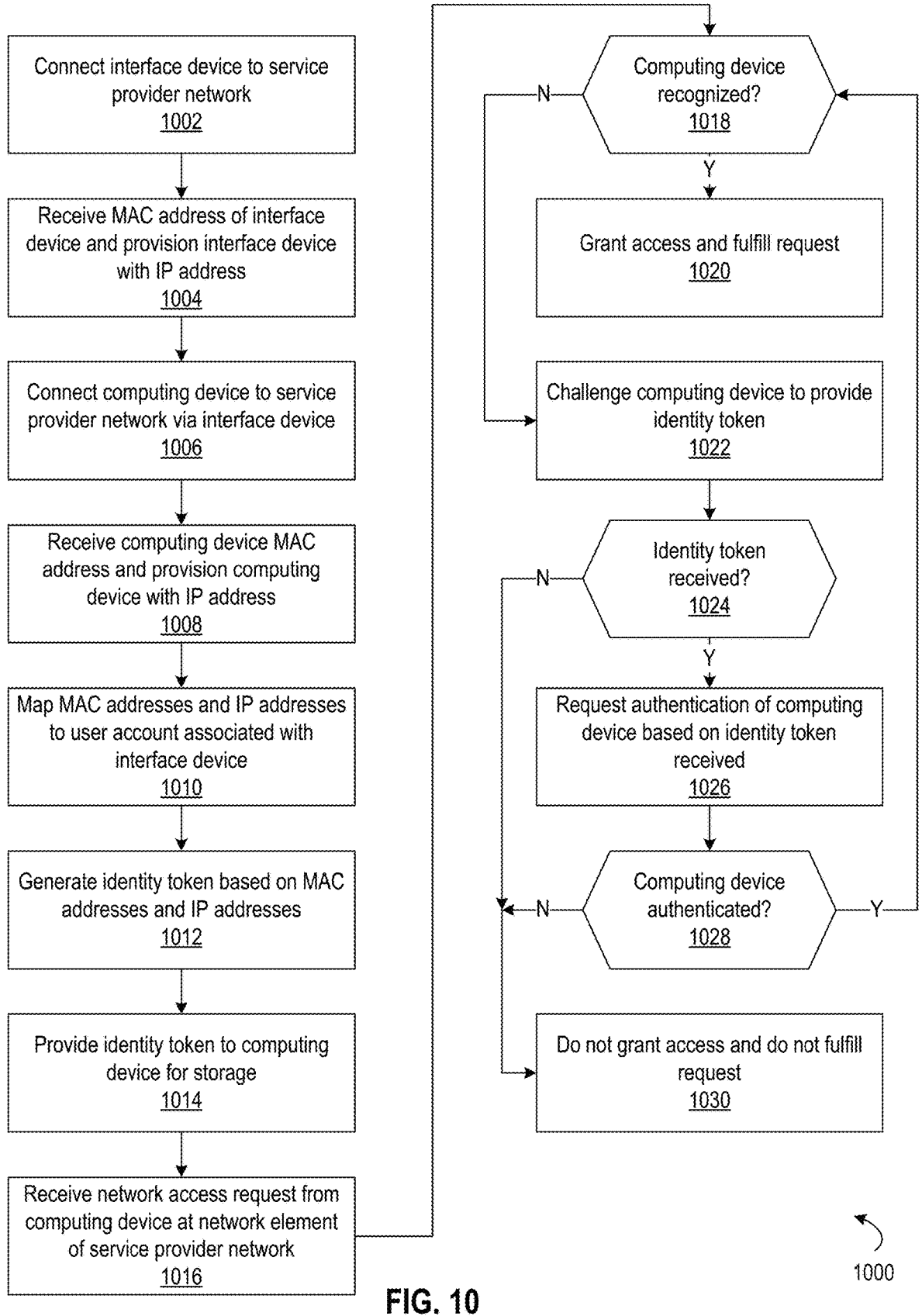
FIG. 10 illustrates a flowchart of example method steps for authenticating a computing device in accordance with aspects described herein.

Referring now to FIG. 10, a flowchart 1000 of example method steps for authenticating a computing device in accordance with aspects described herein is shown. An interface device is connected to a service provider network (block 1002). The service provider network receives the MAC address of the interface device and provisions the interface device with an IP address (block 1004). A computing device then connects to the service provider network via the interface device (block 1006). The service provider network likewise receives the MAC address of the computing device and provisions the computing device with an IP address (block 1008). The respective MAC addresses and the IP addresses of the interface device and the computing device are mapped, at the service provider network, to a user account associated with the interface device (block 1010). An identity token is generated, at the service provider network, based, at least in part, on the respective MAC addresses and IP addresses of the interface device and the computing device (block 1012). The service provider network then provides the identity token to the computing device for storage (block 1014). A network element of the service provider network may then receive a network access request from the computing device. The computing device may provide the network access request via the interface device, via a third-party access gateway, or directly to the network element itself. The network access request, in this example, includes requests for a service provided by the service provider network (i.e., a service request).

If the network element recognizes the computing device (block 1018:Y), then the network element grants the computing device access to the service provider network and fulfills the request (block 1020). If, however, the network element does not recognize the computing device (block 1018:N), then the network element challenges the computing device for the identity token (block 1022). If the network element receives the identity token from the computing device (block 1024:Y), the network element requests authentication of the computing device based on the identity token received (block 1026). If the computing device is successfully authenticated based on the identity token (block 1028:Y), then the network element grants the computing device access to the service provider network and fulfills the request (block 1020). If, however, the computing device cannot be authenticated based on the identity token (block 1028:N), or if the network element does not receive an identity token from the computing device (block 1024:N), then the network element does not grant the computing device access to the service provider network and does not fulfill the request (block 1030). In some example implementations, the network element may repeatedly request the identity token from the computing device until the computing device provides the identity token. In other example implementations, the network element may only repeat the request for the identity token a predetermined number of times. The network element, in this example, would thus only provide the requested service upon receipt and successful validation of an identity token.

Figure 11:
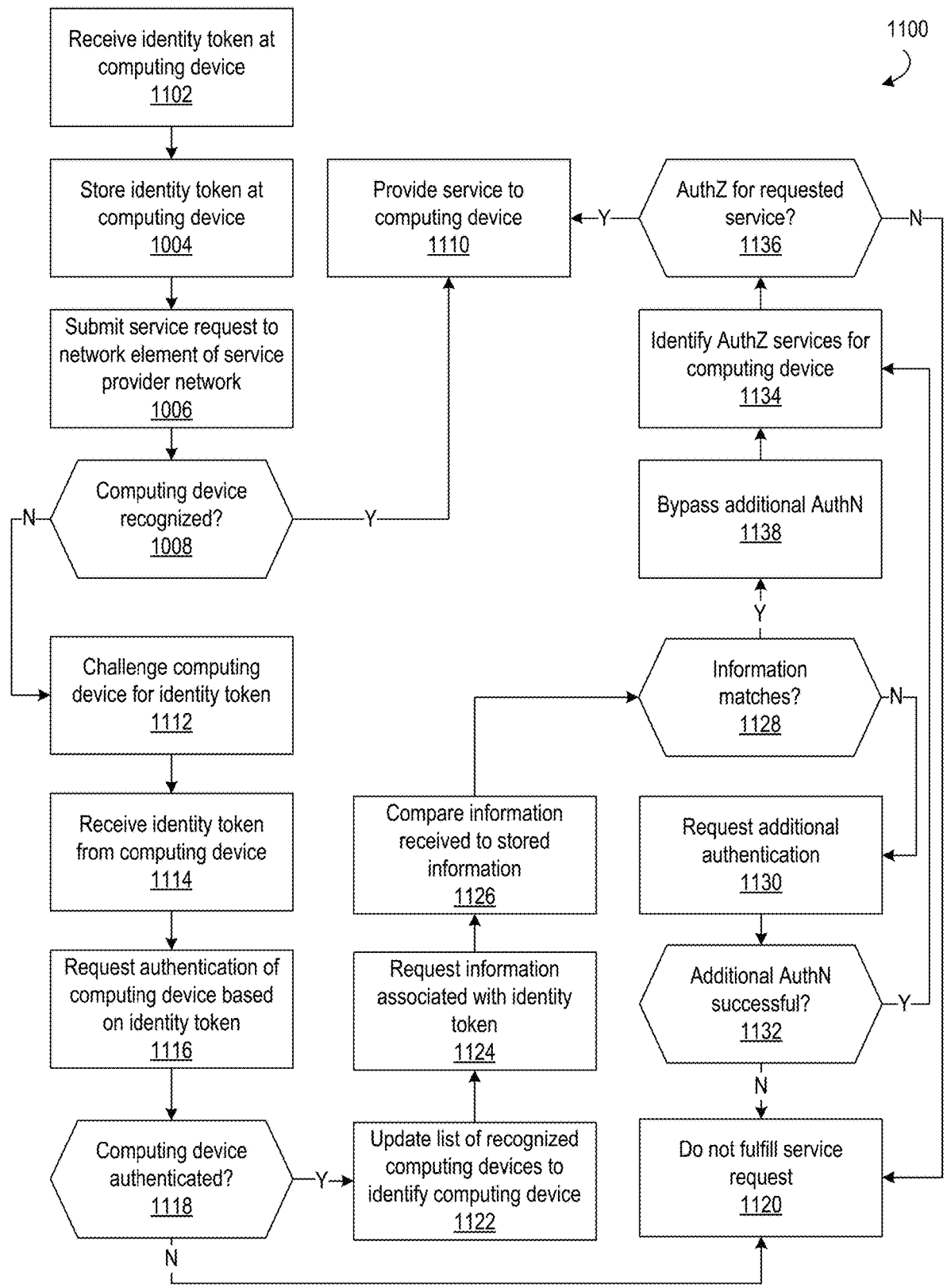
FIG. 11 illustrates a flowchart of example method steps for providing a service to an authenticated computing device via a network in accordance with aspects described herein.

In FIG. 11, a flowchart 1100 of example method steps for providing a service to an authenticated computing device via a network in accordance with aspects described herein is shown. The steps shown by way of example in FIG. 11 incorporate one or more of the events of the example use cases described above with reference to FIGS. 7-9.

A computing device receives an identity token from a service provider network (block 1102) and stores the identity token received (block 1104). The identity token encodes, at least, the MAC address and IP address of the computing device and the MAC address and IP address of an authenticated interface device through which the computing device access the service provider network. The computing device subsequently submits a service request to a network element of the service provider network (block 1106). If the network element recognizes the computing device (block 1108:Y)— e.g., based on the source IP address or MAC address of the computing device—then the network element provides the requested service to the computing device (block 1110).

If, however, the network element does not recognize the computing device (block 1108:N), then the network element challenges the computing device to provide the identity token (block 1112). The network element receives the identity token from the computing device (block 1114) and requests authentication of the computing device based on the identity token (block 1116). If the computing device is not successfully authenticated based on the identity token (block 1118:N), then the network element does not fulfill the service request (block 1120). If, however, the computing device is successfully authenticated (block 1118:Y), then the network element updates a list of computing devices to identify the computing device (block 1122). The network element also requests information associated with the identity token (block 1124). The information may be information regarding the computing device itself, information regarding the interface device the computing device uses to access the service provider network, information regarding a user account associated with that interface device, information regarding an individual that operates the computing device or is associated with the interface device, and the like.

The network element compares the information received in response to the request to stored information (block 1126). If the received information does not match the stored information (block 1128:N), then the network element requests additional authentication from the computing device (block 1130). If the additional authentication is not successful (block 1132:N), then the network element does not fulfill the service request. If, however, the additional authentication is successful (block 1132:Y), then the network element identifies one or more services the computing device is authorized to receive (block 1134). If the requested service is one of the authorized services (block 1136:Y), then the network element fulfills the service request (block 1110). If, however, the requested service is not one of the authorized services (block 1136:N), then the network element does not fulfill the service request (block 1120). If the received information does match the stored information (block 1128:Y), the network element bypasses the additional authentication of the computing device (block 1138) and determines whether the computing device is authorized to receive the requested service as described above.

It will be appreciated with the benefit of this disclosure that the techniques for authenticating computing devices described herein are transparent to the end user. The provisioning of the network configuration data, the receipt and exchange of the identity token, and the authentication and authorization procedures occur automatically between the devices minimal input (if any) from the end user. The experience for the end user is thus advantageously improved as access to network resources and authorized services may occur seamlessly from the perspective of the end user.

It will also be appreciated with the benefit of this disclosure that the authentication techniques described herein advantageously reduce the likelihood that computing devices obtain unauthorized access to the resources and services provided by a service provider network. In particular, the identity token that encodes the binding between the MAC addresses and IP addresses of a computing device and an authenticated cable modem foils attempts to access a service provider network using cloned network configuration data.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
   storing, by a computing device, a value that is based on:
      at least two addresses of a network access device providing network connectivity to the computing device; and
      at least one address of the computing device;
   sending, by the computing device and to a service provider, a first request to receive services from the service provider;
   receiving, by the computing device and from the service provider, a second request for the value; and
   sending, by the computing device, to the service provider and based on the second request, the value.

2. The method of claim 1, wherein the at least two addresses of the network access device comprise a Media Access Control (MAC) address of the network access device and an Internet Protocol (IP) address of the network access device; and wherein the at least one address of the computing device comprises at least one of a MAC address of the computing device or an IP address of the computing device.

3. The method of claim 1, wherein the value comprises a hash of one or more of: a physical address of the network access device, a virtual address of the network access device, a physical address of the computing device, a virtual address of the computing device, a user identifier associated with the computing device, an email address of a user associated with the computing device, or a randomized text string.

4. The method of claim 1, wherein the value indicates an authentication of the computing device via a first protocol; or an authorization to receive services from the service provider via a second protocol different from the first protocol.

5. The method of claim 1, wherein sending the value causes obtaining authorization to receive the services from the service provider.

6. An apparatus comprising:
one or more processors; and
memory storing instructions, when executed by the apparatus, cause the one or more processors to:
store a value that is based on:
at least two addresses of a network access device providing network connectivity to the apparatus; and
at least one address of the apparatus;
send, to a service provider, a first request to receive services from the service provider; and
receive, from the service provider, a second request for the value; and
send, to the service provider and based on the second request, the value.

7. The apparatus of claim 6, wherein the at least two addresses of the network access device comprise a Media Access Control (MAC) address of the network access device and an Internet Protocol (IP) address of the network access device; and wherein the at least one address of the apparatus comprises at least one of a MAC address of the apparatus or an IP address of the apparatus.

8. The apparatus of claim 6, wherein the value comprises a hash of one or more of: a physical address of the network access device, a virtual address of the network access device, a physical address of the apparatus, a virtual address of the apparatus, a user identifier associated with the apparatus, an email address of a user associated with the apparatus, or a randomized text string.

9. The apparatus of claim 6, wherein the value indicates:
an authentication of the apparatus via a first protocol; or
an authorization for the apparatus to receive the services from the service provider via a second protocol different from the first protocol.

10. The apparatus of claim 6, wherein the instructions, when executed by the apparatus, cause the one or more processors to send the value to obtain authorization to receive the services from the service provider.

11. A method comprising:
receiving, by a first computing device and from a second computing device, a first request to provide services to the second computing device;

sending, by the first computing device and to the second computing device, a second request for a value that is based on:
at least two addresses of a network access device providing network connectivity to the second computing device; and
at least one address of the second computing device;
receiving, by the first computing device, from the second computing device and based on the second request, the value; and
causing, by the first computing device and based on the value, authorization for the first request.

12. The method of claim 11, further comprising:
storing, by the first computing device, a candidate value associated with the second computing device, wherein causing the authorization for the first request comprises authenticating the second computing device by determining that the candidate value corresponds to the value.

13. The method of claim 11, further comprising:
storing, by the first computing device, a candidate identifier associated with the second computing device; and
receiving, by the first computing device and from the second computing device, a user identifier associated with the second computing device,
wherein causing the authorization for the first request comprises authenticating the second computing device by determining that the candidate identifier corresponds to the user identifier.

14. The method of claim 11, wherein the at least two addresses of the network access device comprise a Media Access Control (MAC) address of the network access device and an Internet Protocol (IP) address of the network access device; and wherein the at least one address of the second computing device comprises at least one of a MAC address of the second computing device or an IP address of the second computing device.

15. The method of claim 11, wherein the value comprises a hash of one or more of: the at least two addresses of the network access device, the at least one address of the second computing device, a user identifier associated with the second computing device, an email address of a user associated with the second computing device, or a randomized text string.

16. The method of claim 11, wherein the value indicates an authentication of the second computing device via a first protocol; and wherein causing the authorization for the first request comprises causing authorization to provide services to the second computing device via a second protocol different from the first protocol.

17. An apparatus comprising:
one or more processors; and
memory storing instructions, when executed by the apparatus, cause the one or more processors to:
receive, from a computing device, a first request to provide services to the computing device;
send, to the computing device, a second request for a value that is based on:
at least two addresses of a network access device providing network connectivity to the computing device; and
at least one address of the computing device;
receive, from the computing device and based on the second request, the value; and cause, based on the value, authorization for the first request.

18. The apparatus of claim 17, wherein the instructions, when executed by the apparatus, further cause the one or more processors to:
store a candidate value associated with the computing device, wherein causing the authorization for the first request comprises authenticating the computing device by determining that the candidate value corresponds to the value.

19. The apparatus of claim 17, wherein the instructions, when executed by the apparatus, further cause the one or more processors to:
store a candidate identifier associated with the computing device; and
receive, from the computing device, a user identifier associated with the computing device,
wherein the instructions, when executed by the apparatus, cause the one or more processors to cause the authorization based on determining that the candidate identifier corresponds to the user identifier.

20. The apparatus of claim 17, wherein the at least two addresses of the network access device comprise a Media Access Control (MAC) address of the network access device and an Internet Protocol (IP) address of the network access device; and
wherein the at least one address of the computing device comprises at least one of a MAC address of the computing device or an IP address of the computing device.

21. The apparatus of claim 17, wherein the value comprises a hash of one or more of: the at least two addresses of the network access device, the at least one address of the computing device, a user identifier associated with the computing device, an email address of a user associated with the computing device, or a randomized text string.

22. The apparatus of claim 17, wherein the value indicates an authentication of the computing device via a first protocol; and
wherein the authorization for the first request comprises an authorization to provide services to the computing device via a second protocol different from the first protocol.

* * * * *